United States Patent Office 3,299,022
Patented Jan. 17, 1967

3,299,022
POLYMER
William R. Edwards, Baytown, Tex., assignor to Esso Research and Engineering Company, Elizabeth, N.J., a corporation of Delaware
No Drawing. Filed Apr. 4, 1962, Ser. No. 184,920
26 Claims. (Cl. 260—88.2)

The present invention relates to solid, amorphous, elastomeric homopolymers of a novel structure, unsaturated derivatives of the homopolymers, copolymers exhibiting the novel structure, unsaturated derivatives of the copolymers, and methods of obtaining the homopolymers and copolymers.

In one aspect, the present invention is directed to an amorphous, elastomeric polymer having as a repeating group the structure:

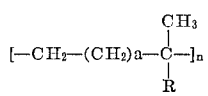

where $a$ is 1, 2 or 3 and R is a $C_1$ to $C_3$ alkyl radical. The subscript $n$ is used throughout the application to refer to a number of repeating groups sufficient to produce a polymer of an amorphous, elastomeric nature. The molecular weight, determined by the degree of polymerization $n$, may vary from about 50,000 to several million. Molecular weights as high as 1½ to 2 million have been attained both in the homopolymeric form and in the copolymeric form.

In its most specific embodiment, this aspect of the invention relates to polymers of particular isoolefin feed stocks: 3-methylbutene-1, 3-methylpentene-1, 4-methylpentene-1, and 5-methylhexene-1. These olefins may be polymerized to give the novel structure either as homopolymers or as copolymers with each other or with isobutylene.

In a second aspect, the present invention relates to "structural copolymers" obtainable from the 4-methylpentene-1 or 5-methylhexene-1 by carrying out the process of the present invention under certain conditions and at certain temperatures.

In a third aspect, the present invention relates to a method of producing the homopolymers, copolymers, and "structural copolymers" above described.

In a fourth aspect, the present invention relates to unsaturated derivatives of the novel homopolymers and copolymers.

HOMOPOLYMERS

The novel amorphous, elastomeric homopolymers of the present invention are rubber-like in nature, ranging in characteristic from a tacky solid exhibiting moderate cold-flow tendencies to a nontacky solid having the ability to return to its original form after being stretched to several times its original size. The polymers are clear-to-white in color and are generally soluble in hydrocarbons. The molecular weight may range from about 50,000 to several million, and the tackiness and cold-flow tendencies are inversely related to the molecular weight; i.e., the polymers become less tacky and have less tendency to flow as the molecular weight increases.

These homopolymers, and the copolymers of similar structure, involve a polymer linkage which has heretofore been thought to be impossible. Although the olefin monomers are methyl substituted on a carbon atom other than an unsaturated carbon, it is through the methyl-substituted carbon atom that one linkage is accomplished. For example, in 3-methylbutene-1, the polymer linkages are at the 1 and 3 positions. This may be visualized as follows:

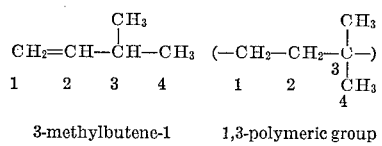

3-methylbutene-1    1,3-polymeric group

It has been thought possible heretofore to obtain polymerization of olefins only through the carbon atoms sharing the olefinic linkage. In the case of the isoolefin feed stock of the present invention (and in all α-olefins), this would be termed 1,2-polymerization. Structurally, the repeating group expected from the teachings of the prior art would be derived as follows (using 3-methylbutene-1 as an example):

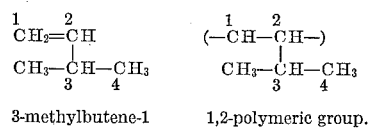

3-methylbutene-1    1,2-polymeric group.

A comparison of the repeating polymeric groups reveals the substantial differences between the two types of polymer. In the 1,3-polymerization, three carbon atoms enter into the linear chain, whereas only two carbons enter the chain in 1,2-polymerization. Where the olefin is 3-methylbutene-1, 4-methylpentene-1, and 5-methylhexene-1, the 1,3-, 1,4-, or 1,5-polymer is symmetrical about the chain, exhibiting a geminal dimethyl structure in each repeating group, whereas in the 1,2-polymerization, the polymer is exclusively in the form of "dangling" groups in each repeating unit.

The polymer of the present invention is analogous to the structure which is found in the elastomer produced from isobutylene. Although polyisobutylene is produced by 1,2-polymerization, it exhibits a di-substituted carbon atom and is symmetrical with respect to the linear polymer chain. The analogy in structure is apparent from a comparison of the structure of the repeating group in polyisobutylene with the repeating group in the polymer of the present invention where 3-methylbutene-1, 4-methylpentene-1, or 5-methylhexene-1 is used as the monomer. In the comparison below, hydrogen atoms have been omitted for clarity.

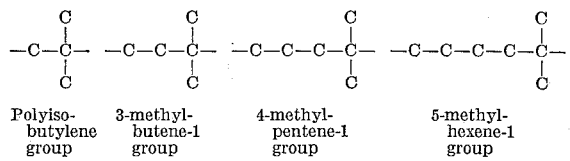

| Polyiso- | 3-methyl- | 4-methyl- | 5-methyl- |
| butylene | butene-1 | pentene-1 | hexene-1 |
| group | group | group | group |

As will be seen, polyisobutylene exhibits the geminal dimethyl structure, but the geminal-substituted carbon atoms are separated by only one alkylene group, whereas in the polymer of the present invention, at least two alkylene groups occur between the geminal-substituted carbon atoms. This is a substantial difference, as will be set forth hereinafter.

One of the undesirable characteristics of polyisobutylene is that the di-substituted or geminal methyl substituted carbon atoms are separated by only one methylene group. This configuration gives rise to steric hindrance between the substituted methyl groups so that rotation about the linear polymer chain is precluded, thus depriving the polyisobutylene elastomer of the rotative degree of freedom. It has been established that the loss of this degree of freedom interferes with the ability of polyisobutylene to dissipate heat, and this constitutes a drawback in the use of polyisobutylene in the compounding of automobile tires, for instance. In the polymer of the present invention, however, the linkage is not 1,2-, and the di-substituted carbon atoms are separated by more than one alkylene group. This allows rotation of the dimethyl-substituted carbon atoms about the axis of the polymer, providing a degree of freedom which is not available in polyisobutylene. Obviously, then, the polymer of the present invention, being elastomeric and having a degree of freedom not obtainable in polyisobutylene, has in general the same uses as polyisobutylene but with an added advantage with respect to the dissipation of heat. In the compounding of automobile tires, for example, the use of the polymers of the present invention produces a greater heat dissipation and, therefore, a cooler running tire. For this reason, a greater tread thickness may be used, resulting in longer tire wear.

A further advantage of the polymers of the present invention in comparison with polyisobutylene is the ability of the polymers of the present invention to be unsaturated by halogenation and dehydrohalogenation or other well-known means. By reason of the structure of the polyisobutylene with the steric hindrance which is present, it is impossible to halogenate polyisobutylene without disrupting the chain length by cleavage. In the present polymers, since there is at least one alkylene group more than in polyisobutylene between the geminal dimethyl carbons, halogenation and dehydrohalogenation may be accomplished easily without undue destruction of the polymer chains. This improves the ability to bond the novel polymer with natural or with other synthetic rubbers, an ability that polyisobutylene lacks. It also provides unsaturation for vulcanization operations.

Accordingly, it is seen that the polymers of the present invention have unobvious and unexpectedly superior properties in comparison with polyisobutylene and, in general, may be used in a manner similar to polyisobutylene although possessing the enumerated advantages thereover.

PREPARATION

The present polymers may be prepared by a reaction at low temperatures in the presence of an aluminum chloride (AlCl$_3$) catalyst. The feed stock for the polymerization reaction, however, must be free of normal and isodiolefins and normal olefins, as will be discussed in more detail hereinafter. Catalyst poisons, such as alcohols, must also be excluded.

*Feed stocks.*—Suitable monoolefin feed stocks for the present invention comprise the olefins of the general formula:

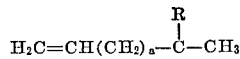

wherein $a$ is either 0, 1, or 2; and wherein R is a $C_1$ to $C_3$ alkyl radical. Particularly suitable for polymerization are 3-methylbutene-1, 4-methylpentene-1, and 5-methylhexene-1.

Diolefins and normal olefins may occur in the same boiling range as the monoolefins. In the case of 3-methylbutene-1, it has been found that 1,4-pentadiene occurs in the same boiling range and is an inhibitor of the reaction which must be removed, as hereinafter discussed. Other olefins which are suitable for polymerization by the novel mechanism of the present invention comprise 3-methylpentene-1, 3-methylhexene-1, 4-methylhexene-1, 4-methylheptene-1, and 5-methylheptene-1. Although the above-named feed stock olefins react to produce the novel non-1,2-linkage, they have individually differing characteristics. For example, the tendency to form a certain portion of the polymer chain by 1,2-linkages increases with the number of $CH_2$ groups in the feed stock olefin; conversely, the tolerance for inhibitors seems to increase with the number of $CH_2$ groups.

*Catalyst.*—The novel polymerization reaction of the present invention has been accomplished by using aluminum chloride (AlCl$_3$), a cationic polymerization catalyst.

The catalyst may be used alone or in solution in an inert solvent. Suitable solvents for carrying the catalyst are those which do not enter into the reaction or deactivate the catalyst; particularly excluded are alcohols, diolefins, whether conjugated or nonconjugated, and monoolefins. Inert solvents, such as ethyl chloride, methyl chloride, isopentane, petroleum ether, etc., may be used as catalyst carriers. It has been found that it is sometimes desirable to prepare a saturated solution of the catalyst in a portion of the inert solvent at a temperature higher than the reaction temperature, and then to introduce this solution into the reaction zone so that upon cooling a greater than saturated solution is presented as a catalyst. Additional catalyst may be added after the solution has been introduced in order to obtain an excess. The concentration of catalyst in inert solvent may be from 0.01 g./100 cc. to 2 g./100 cc. The ratio of solution to olefin being polymerized may be from 1:3 to 20:1.

*Temperature.*—The reaction may be carried out at various temperatures, generally within the range from −150° C. to 0° C., depending upon the particular solvent being used and upon the particular monoolefin being polymerized. It is obvious that the temperature should not be lower than the freezing point of the inert solvent, and, therefore, if a low temperature is desired, the solvent should be chosen to match the temperature.

In the polymerization of 3-methylbutene-1, temperatures below −40° C. are preferred, giving the desirable high molecular weights.

It has also been found that the temperature has an important effect upon the structural specificity in the formation of the polymers when using a feed stock of 4-methylpentene-1 or 5-methylhexene-1. At a temperature below −60° C., 4-methylpentene-1 is specific to the formation of the 1,4-polymer of the present invention, essentially all of the repeating groups being found to be of the 1,4-type. The 4-methylpentene-1 polymer formed at about −40° C. contained 90% 1,4-linkages. Similarly, at a temperature below −60° C., 5-methylhexene-1 has a specificity to 1,5-linkage, approximately 60% of the repeating groups being of the 1,5-type. At higher polymerization temperatures, the specificity toward the 1,4- or 1,5-linkage decreases, so that a higher percentage of 1,2-linkages appear as repeating groups in the polymer chain. By conducting the polymerization reaction at the higher temperatures, so-called "structural copolymers" of a monomer may be obtained of variable but generally predictable ratios of 1,4- or 1,5-structural units in the chain. This is a valuable way of controlling the nature of the final product. The number of "dangling" groups (resulting from 1,2-linkages) in a polymer chain may be varied to affect the oxidative stability, reactivity, elasticity, glass transition temperature, and many other properties.

*Inhibitors.*—The polymerization mechanism of the present invention is particularly susceptible to the presence of inhibitors which may prevent the formation of the polymer of the present invention and/or prevent the attaining of high molecular weights. It has been found that the presence of diolefins, conjugated or nonconjugated, the critical amount depending upon the particular diolefin and the monomer; so inhibit the mechanism of the present reaction as to render the products either different structurally, that is, predominantly 1,2-polymers, or of such low molecular weight as to be unusuable in the desired manner, or both. For example, in a diolefins-free polymerization, the novel polymers can be obtained in molecular weights of 50,000 to 1,000,000 or more. Where diolefins are present in amounts as small as 0.21%, molecular weights as high as 50,000 are unattainable. Typical of the diolefins which are poisons for this reaction is 1,4-pentadiene, which occurs normally in admixture with 3-methylbutene-1, and which must be reduced to less than about 300 p.p.m. before the olefin is submitted to the polymerization reaction. It has also been found that isoprene, which is well recognized as suitable for copolymerization with isobutylene, is an inhibitor for the present process and must be rigorously excluded from the reaction zone when polymerizing 3-methylbutene-1. Normal olefins such as pentene-1 also inhibit the formation of the high molecular weight polymers of the present invention. The maximum tolerance of each isoolefin feed stock for these inhibitors can be easily determined by routine experimentation.

These inhibitors may be removed from the olefins by a number of methods. In the case of 3-methylbutene-1, it has been found particularly desirable to use a 4 A. molecular sieve as a pretreatment, which removes the normal olefins and diolefins from the 3-methylbutene-1, leaving substantially no normal olefins or diolefins present in the treated product. The 4 A. molecular sieve is a crystalline sodium alumino silicate, having openings in the order of 4 Angstrom units in diameter, whereby normal olefins and diolefins may be selectively removed from the stream wherein isoolefins are present. Normally, it is possible to separate the inhibitors from 4-methylpentene-1 and 5-methylhexene-1 by fractional distillation.

SPECIFIC ISOOLEFINS

*General.*—A number of runs were made utilizing certain isoolefins as monomers. These isoolefins were 3-methylbutene-1, 4-methylpentene-1, 3-methylpentene-1, and 5-methylhexene-1. The reactions were carried out in chilled baths, utilizing ice in order to obtain a temperature of 0° C., or Dry Ice in order to obtain lower temperatures. The molecular weights of the polymeric products were estimated by the observation of the physical characteristics, including tackiness, cold-flow characteristics, viscosity, malleability, etc. The characterization of the polymer structure was obtained by submitting the polymeric products to nuclear magnetic resonance (NMR) analysis.

Although wide-line NMR has been used for some time to characterize saturated polymers of this type, the application of high resolution NMR to the study of the structures of high molecular weight saturated materials is relatively new. The value of high resolution NMR in the case of high molecular weight saturated polymers stems partially from the fact that even though the chemical shifts are small, the spin-spin multiplets for the methyl groups are easily recognizable as distorted first order multiplets. Methyl groups in $CH_3$—$CH_2$ groups produce triplet resonances, those in $CH_3$—$CH$ groups produce doublets, and those in $CH_3$—$C$ groups produce singlets. Mixtures of these groups produce complex but stable patterns which are recognizable by comparison with spectra of known compounds. The chemical shifts are large enough to produce usable band separation, so that band positions and intensities can be used to estimate the relative numbers of $CH_3$, $CH_2$, and $CH$ groups in the average repeating unit. It must be emphasized that satisfactory comparison of the spectra of saturates requires the use of a spectrometer of exceptionally high stability. Proton signal control of the magnetic field or of the field frequency ratio is highly desirable.

The polymers of the present invention were subjected to NMR analysis, and the spectra were compared to those of known samples. Polyisobutylene, for example, produces a sharp singlet resonance characteristic of geminal methyl ($CH_3$—C) groups, and of isolated methylenes ($CH_2$). This spectrum is offset toward low field from the spectra of the other polymers as a result of the extreme crowding and steric hindrance of the various sections of this molecule. A smaller shift in the same direction has been noted in the spectrum of 2,2,4,4-tetramethylpentanes in which the steric arrangement is similar to that of polyisobutylene. The downfield shift is less pronounced in the spectrum of 2,2,3,3-tetramethylbutane, and is not present at all in the spectrum of 3,3,4,4-tetramethylhexane. In the last two compounds, the geminal methyls are relatively free to rotate about the bond joining the quaternary carbons, while the bending introduced by the methylene in the tetramethyl pentane produces a much greater crowding of the methyls and severe hindrance to all rotation. Introduction of two or more methylenes between the geminal methyls relieves the crowding and makes free rotation possible again, and the resonances resume their normal positions. Thus, the marked downfield shift of the hydrogen resonances particularly of the methyl hydrogen resonances, indicates severe crowding of the methyl group in the molecule.

The spectrum of the polymer of 3-methylbutene-1 was found to exhibit sharp resonances similar to those of polyisobutylene, except that the resonances are in the normal positions without the downfield shift attributable to steric hindrance in the polyisobutylene. This is indicative of the separation of the geminal methyls by more than one methylene group. In some instances, the polymer of 4-methylpentene-1 exhibited a somewhat broader resonance bands, indicating that groups other than geminal methyl and isolated methylenes were present in the polymer. The spectra of the polymer of 5-methylhexene-1 also sometimes showed definite evidence of the doublet which is characteristic of the $CH_3CH$ (including isopropyl) groups. This resonance is attributed to the presence of 1,2-polymerization repeating units in the polymer of 5-methylhexene-1. On the other hand, 5-methylhexene-1 also exhibited a reasonably sharp methyl peak which was superimposed on the doublet, and a resonably sharp methylene band which is attributed to the presence of a 1,5-structure in the polymer. From the analysis of the spectrum, the occurrence of the various structural configurations could be estimated. The ratio of intensities of the methyl to methylene resonances decreases with the increasing length of the monomer change, as is required by the structure of the novel polymer.

All polymers produced by the present invention were characterized by the NMR resonance analysis as generally set forth above. Certain of the compounds were also subjected to infrared analysis, which serve as a confirmation of the structure which was determined by NMR analysis.

*3-methylbutene-1.*—As an illustration of the practice of the present invention in using 3-methylbutene-1 as a feed stock, a concentrate of 3-methylbutene-1 was obtained which was, however, contaminated with certain normal olefins and normal diolefins. A treatment process was devised which involved washing the 3-methylbutene-1 concentrate with an aqueous solution of 5° Bé. sodium hydroxide, followed by water wash, and thereafter followed either by the combination of molecular sieve treatments with 13× molecular sieve to remove water, followed by 4 A. molecular sieve, or by omitting the treatment with 13× molecular sieve and treating the material with a 4 A. molecular sieve only. All of these steps were accomplished at ambient temperature and at substantially atmospheric pressure.

An analysis of the untreated concentrate, together with the analysis of the material after treatment with caustic, water, and the 13× molecular sieve, and after treatment with caustic, water, 13× and 4 A. molecular sieves is set forth below in Table I. The 13× molecular sieve is a crystalline calcium alumino silicate molecular sieve having an average pore diameter of 13 angstroms.

TABLE I.—ANALYSES OF 3-METHYLBUTENE-1

| | Untreated | After Caustic Wash, Water Wash and Contact with 13× Molecular Sieve | After Caustic Wash, Water Wash, Contact with 13× Molecular Sieve and Contact with 4 A. Molecular Sieve |
|---|---|---|---|
| Water (p.p.m.) | (¹) | 13.3 | (¹) |
| Sulfur (p.p.m.) | 165 | 1.0 | 3.0 |
| Analysis, Vol. Percent: | | | |
| Propane | | 0.01 | 0.00 |
| n-Butane | | 0.02 | 0.02 |
| Iso-butene and butene-1 | | 0.02 | 0.01 |
| t-Butene-2 | 0.04 | 0.04 | 0.00 |
| c-Butene-2 | 0.07 | 0.04 | 0.02 |
| Isopentane | 0.22 | 0.29 | 0.26 |
| 3-methylbutene-1 | 99.29 | 99.40 | 99.65 |
| Pentene-1 | 0.08 | 0.00 | 0.00 |
| 2-methylbutene-1 | 0.09 | 0.00 | 0.00 |
| 2-methylbutene-2 | | 0.03 | 0.04 |
| 1,4-pentadiene | 0.21 | 0.15 | 0.00 |
| Total | 100.00 | 100.00 | 100.00 |

¹ Not tested.

*Example 1*

As an example of a preferred mode of carrying out the present invention, a 3-methylbutene-1 concentrate which had been treated with a caustic wash, water wash, and 13× and 4 A. molecular sieves, and having a composition as shown in the third column of Table I, was utilized. A solution of 0.25 g. of aluminum chloride in 20 cc. of methyl chloride was stirred for 30 minutes at −63° C. The treated 3-methylbutene-1 was added and stirring was continued for 2 to 5 minutes, and a fast reaction was observed. From 5.0 cc. of 3-methylbutene-1 concentrate, 3.5 g. of polymer were recovered which represents 100% conversion. The molecular weight of the polymer was about 100,000, and the NMR analysis indicated that the polymer structure was exclusively of the geminal dimethyl type, having a repeating group of the formula:

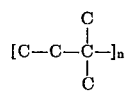

(Hydrogen atoms in all examples are omitted for clarity.)

*Example 2*

In order to illustrate the effect of temperature upon the polymerization of 3-methylbutene-1, a treated feed stock as used in Example 1 was obtained. Aluminum chloride (0.02 g.) was added to 2 cc. of the 3-methylbutene-1 in an ice bath at 0° C. and the mixture was agitated at 5 to 10 minute intervals over a 3-hour period. The product was poured into acetone, with a few drops of water to increase precipitation. The acetone was then boiled off and a clear, sticky polymer remained. This polymer was analyzed by nuclear magnetic resonance. The polymer was indicated to be 100% geminal dimethyl formation of the structure:

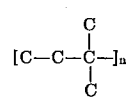

The molecular weight of the polymer was about 3000. Thus, at this relatively high temperature, the elastomeric high molecular weight polymer of the present invention was not obtained.

*Example 3*

Aluminum chloride (1.5 g.) was added to 107 g. of methyl chloride and stirred for 2 hours at −70° C. A treated 3-methylbutene-1 concentrate, prepared in the same manner as that used in Example 1, was then added slowly over a 15-minute period until a total of 90 cc. of the concentrate had been added. Polymerization occurred as the olefin was added to the catalyst solution, resulting in a temperature range of −40° C. to −60° C. The polymer was poured into water at 180° F. to flash off the methyl chloride, and a rubbery product was recovered. This product was tacky and elastomeric, having a molecular weight of about 50,000, with an NMR analysis indicating 100% geminal dimethyls, or a repeating structure of:

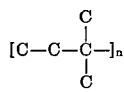

*Example 4*

In order to illustrate that the addition of an excess of aluminum chloride is sometimes desirable in order to initiate the polymerization reaction, the following example is given.

Aluminum chloride (1.5 g.) was added to 573 g. of methyl chloride and stirred for 2 hours at −70° C. A treated 3-methylbutene-1 concentrate, similar to that in Example 1, was placed in a flask (300 cc. of the concentrate being used) and chilled to −70° C. 300 cc. of the aluminum chloride solution was chilled to −70° C. and added to the 3-methylbutene-1 concentrate. The mixture was stirred for 2 hours with no evidence of polymerization, maintaining a temperature of −70° C. At this time, 0.3 g. of aluminum chloride was added, and stirring continued. Within 15 minutes the reaction had initiated and liberated so much heat that the flask boiled over. Olefin conversion was apparently 100%. The product remaining in the flask was poured into hot water to flash off the methyl chloride, and a polymeric product was recovered. The molecular weight appeared to be about 50,000, and the structure of the polymer as indicated by NMR analysis was 100% geminal dimethyls, having the 1,3-polymerization linkage exclusively.

The effects of normal olefins and diolefins and isodiolefins as inhibitors of the reaction of the present invention has been discussed above, particularly with respect to the effect of these inhibitors in preventing the formation of high molecular weight polymer. The following examples are given as an illustration of this effect.

*Example 5*

A sample of untreated 3-methylbutene-1 having the composition as set forth in column 1 of Table I was obtained. Aluminum chloride (0.5 g.) and 235 g. of methyl chloride were stirred at −70° C. for 40 minutes. To the catalyst solution was added 50 cc. of the untreated 3-methylbutene-1, and stirring was continued for 4 hours. The contents of the reaction flask was then poured into warm water to flash off the methyl chloride, and a polymer was recovered. The yield was approximately 33%, and the molecular weight was about 30,000. It is apparent that the presence of the inhibitors, chiefly 1,4-pentadiene, prevented the formation of the preferred high molecular weight polymer of the present invention.

*Example 6*

A catalyst solution was prepared by stirring 0.25 g. of aluminum chloride in 20 cc. of methyl chloride for 30 minutes at −73° C. An admixture of 6 cc. of treated 3-methylbutene-1 and 0.3 cc. of isoprene was added to the catalyst solution and stirred. The reaction rate was very slow, and a yield of only 35% was obtained. The molecular weight of the polymeric product was only 20,000. An analysis by NMR indicated that no unsaturation occurred in the polymer, indicating that no copolymerization was present and that only 3-methylbutene-1 was present in the polymer chain.

*Example 7*

A catalyst solution was prepared by stirring 0.25 g. of AlCl$_3$ in 20 cc. of methyl chloride for 30 minutes at −65° C. A concentrate of 3-methylbutene-1 containing 300 p.p.m. by volume of 1,4-pentadiene was chilled to −65° C., and 2.7 g. of the chilled concentrate were added to the catalyst solution and stirred for 5 minutes. A 100% conversion was obtained, and a polymer of about 50,000 molecular weight was recovered. NMR analysis showed the linkages to be entirely by 1,3-polymerization. Thus, it appears that 300 p.p.m. of 1-4-pentadiene may be tolerated if the lower range of attainable molecular weights is satisfactory. However, the preferred extremely high molecular weight product (100,000+) is not formed where as much as 300 p.p.m. by volume of 1,4-pentadiene is present.

In sum, the examples illustrate that 3-methylbutene-1 may be polymerized by a 1,3-linkage in order to produce a high molecular weight, rubbery elastomer under the conditions set forth if normal olefins and normal isodiolefins are substantially excluded from the reaction zone and if the temperature is kept low enough.

*4-methylpentene-1.*—4-methylpentene-1 is capable of forming a repeating group similar to that obtained from 3-methylbutene-1, the only difference being in the inclusion of an additional methylene group in the linear polymer chain. The geminal dimethyl structure which was observed in the 3-methylbutene-1 polymer is also present in the 4-methylpentene-1 polymer. However, by reason of the additional methylene groups, the specificity of the polymerization reaction to the geminal dimethyl-type structure is somewhat less at higher temperatures than that which was obtained with the polymerization of 3-methylbutene-1. This gives rise to the possibility of modifying the molecular structure of the polymer obtained from 4-methylpentene-1, which would technically be a homopolymer but which is referred to as a "structural copolymer," by conducting the reaction at a higher temperature so that an admixture of structural units of the 1,2-type as well as of the 1,4-type linkage would occur. The respective amounts of the two types of linkage in the "structural copolymer" could be adjusted by control of the temperature of reaction. Below about −60° C., the 1,4-type linkage is almost exclusive, being over 95% of the repeating linkages. Above this temperature, the structural copolymer may be obtained with a 1,2-linkage incidence increasing with the temperature of polymerization. This is illustrated by the examples given below.

*Example 8*

A catalyst solution of 0.25 g. of aluminum chloride in 20 cc. of methyl chloride was mixed for 30 minutes at −65° C. Five grams of a substantially diolefin and normal olefin-free 4-methylpentene-1 concentrate were added and immediate reaction was observed. A 100% conversion was obtained and a rubbery polymer was recovered having a molecular weight of about 100,000. An NMR analysis indicated that the linkages were exclusively 1,4-, with all repeating units containing the geminal dimethyl groups.

*Example 9*

The above experiment was repeated by preparing a catalyst solution of 0.25 g. of aluminum chloride in 20 cc. of methyl chloride, and admixing the solution for 30 minutes at −63° C. Five grams of inhibitor-free 4-methylpentene-1 were chilled to −63° C. and added. An immediate reaction occurred, with 100% conversion being attained. The molecular weight of the polymer was about 300,000, and an NMR analysis indicated that essentially all of the repeating groups exhibited the 1,4-linkage.

*Example 10*

An admixture of 50.0 cc. of inhibitor-free 4-methylpentene-1 and 50.0 cc. of "petroleum ether" was charged to a 500 cc. flask, stirred, and cooled to −40° C. Aluminum chloride (1.0 g.) was added and stirred for 3 hours and then poured into acetone and a small amount of water added to precipitate the polymer. A clear gelatinous precipitate formed and was allowed to settle overnight. The polymer settled to the bottom and was recovered by decantation of the liquid and drying under a vacuum. A white, rubbery polymer of about 100,000 molecular weight remained.

NMR analysis showed a structure of:

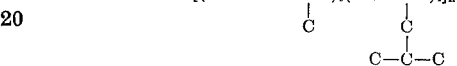

*Example 11*

A mixture of 2.0 cc. of diolefin-free 4-methylpentene-1 and 0.02 g. of aluminum chloride was immersed in an ice bath at 0° C. in a test tube, for 3 hours, and thereafter was poured into acetone with a few drops of water. After precipitation, acetone was boiled off and a polymer remained which was clear and sticky.

The resulting polymer was submitted to NMR analysis and a structure was determined as follows:

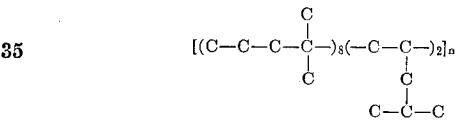

The molecular weight of the product was only about 3000. Thus, at the higher temperature, a low molecular weight product is formed and the ratio of 1,2-structural units increases.

In order to illustrate the effect of diolefins upon the polymerization of 4-methylpentene-1, an admixture of this olefin with isoprene was subjected to polymerization as follows:

*Example 12*

A catalyst solution was prepared by stirring 0.25 g. of AlCl$_3$ in 20 g. of methyl chloride for 30 minutes at −73° C. An admixture of 6 cc. of 4-methylpentene-1 with 0.3 cc. of isoprene was chilled to the same temperature and added to the catalyst solution. The reaction mixture was stirred for 5 minutes and then poured into hot (83° C.) water to flash off the methyl chloride.

Only 15% conversion was obtained, and the structural formula included 40% 1,2-linkages. Like 3-methylbutene-1 (see Example 6), the 4-methylpentene-1 did not form a copolymer with the isoprene. The molecular weight was only 30,000, showing that the diolefin affects 4-methylpentene-1 polymerization in this regard in the same way as it affects 3-methylbutene-1.

Thus, it is seen that the diolefin inhibitor had three effects:

(1) It shifted the specificity of the polymerization away from the 1,4-linkage to the 1,2-linkage;

(2) It reduced the conversion to a low level; and (3) It modified the structure and prevented the attainment of the desirable high molecular weight product.

Isobutylene and isoprene, copolymerized under the same conditions as in Example 11, gave 100% yield. This points up the difference in reactivity between isobutylene and the olefins of the present invention.

Thus, it is seen that at temperatures around −63° to −65° C., the polymerization reaction is specific to the 1,4-polyisopentylene structure. At −40° C., only 10% of the polymer is made up of 1,2-linkages, while at 0° C., the polymer chain contained about 20% 1,2-structures and was of low molecular weight. Each formed, however, a structural copolymer of the 1,2-structure with the novel 1,4-repeating unit.

*3-methylpentene-1.*—As an illustration of the novel polymerization reaction of the present invention as applied to an olefin which will not produce a repeating structure which contains geminal dimethyl groups, but rather which contains a di-substituted carbon atom wherein only one of the substitutions is a methyl group, the following example is presented.

Example 13

A normal olefin and diolefin-free 3-methylpentene-1 was submitted to polymerization under the following conditions. A charge of 2.0 cc. of 3-methylpentene-1 was placed in a test tube in an ice bath at 0° C., and 0.02 g. of aluminum chloride was added. The mixture was allowed to remain in the ice bath for 3 hours, during which time a reaction occurred producing a polymeric product. The reaction mixture was then poured into acetone with a few drops of water in order to form a precipitate. The acetone was then boiled off leaving a small amount of a polymer. The polymeric product had a molecular weight of about 3000, and it was believed to have a structure of:

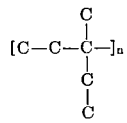

*5-methylhexene-1.*—5-Methylhexene-1 is similar to both 3-methylbutene-1 and 4-methylpentene-1 in having a methyl-substituted carbon atom which can form a polymeric linkage with a geminal dimethyl structure. The 5-methylpentene-1 has one further methylene group in the chain than that of 4-methylpentene-1, and has two methylene groups more than 3-methylbutene-1. The polymer produced from this olefin will possess a greater rotative freedom and a greater flexibility than that exhibited by the polymers of the other two olefin feed stocks. In order to show that the novel repeating structure of the present invention can be obtained in 5-methylhexene-1, the following example is submitted.

Example 14

A catalyst solution of 0.25 g. of aluminum chloride in 20 cc. of methyl chloride was prepeared by stirring the compounds together for 30 minutes at −63° C. To the catalyst solution was added a chilled sample of contaminant-free 5-methylhexene-1 (5 cc.). The reaction was slow and the reactants were stirred for 3½ hours. Three grams of polymer were recovered, indicating 100% conversion. The molecular weight of the polymer was about 40,000, and an NMR analysis indicated the structure to be:

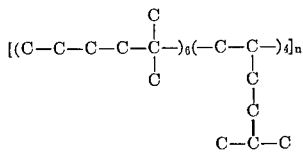

It is seen that 60% of the repeating groups exhibited the geminal dimethyl substitution.

Example 15

In order to illustrate the increase in incidence of the 1,2-polymeric linkage as the reaction temperature is raised, the following run was made.

A solution of 0.01 g. of aluminum chloride in 1.0 cc. of 5-methylhexene-1 was placed in a test tube at 0° C. for 3 hours. At the end of this time, the reaction mixture was poured into acetone and a few drops of water added to aid precipitation. The acetone was boiled off, and a small amount of polymer was recovered. The molecular weight of the polymer was about 2000, and the NMR analysis indicated a structure of:

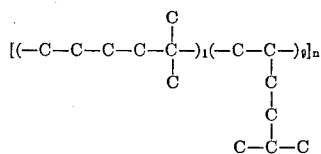

It is evident from the NMR analysis that the 1,2-repeating group constitutes 90% of the polymer chain, rather than 40% as was formed in Example 12 at −63° C. Note also the low molecular weight which was obtained at 0° C (3000) compared to the 40,000 at −63° C.

COPOLYMERS

Another aspect of the present invention is the formation of copolymers of 3-methylbutene-1, 4-methylpentene-1, 3-methylpentene-1, 5-methylhexene-1, and the like, with each other and with isobutylene. By the practice of the present invention, the novel type of linkage is maintained or maximized even in the copolymerization of the suitable feed stock with each other or with isobutylene.

It is necessary, if the 1,2-polymerization mechanism is to be avoided or minimized, to carry out the copolymerization reaction in the substantial absence of inhibitors such as conjugated and non-conjugated diolefins, as discussed supra with respect to the homopolymerization reaction. As is evident from the examples, in all of the following discussion (and in the claims) $x$, $y$ and $z$ are each whole numbers greater than 0, and represent the relative amounts of each repeating group in the randomly distributed polymers.

The random copolymers with isobutylene would exhibit the following structures:

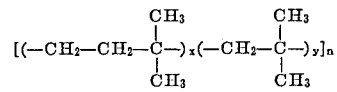

3-methylbutene-1 and isobutylene

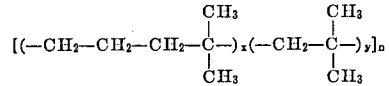

4-methylpentene-1 and isobutylene

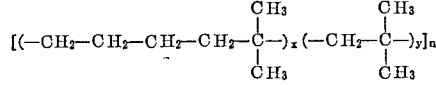

5-methylhexene-1 and isobutylene wherein $x$ and $y$ represent the relative amounts of each repeating group.

If the "structural copolymers" of 4-methylpentene-1 and 5-methylpentene-1 are formed in the polymer with isobutylene, the polymers will exhibit the formulas:

4-methylpentene-1:

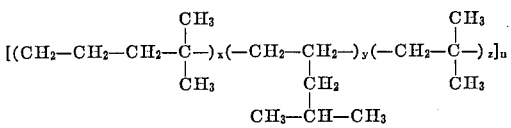

wherein $x+y$ is from 5% to 95% of the polymer and $z$ is, conversely, from 95% to 5%, and the ratio $x/y$ is from 1:9 to 9:1.

5-methylhexene-1:

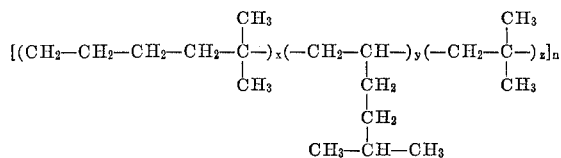

wherein $x+y$ is from 5% to 95% of the polymer and $z$, conversely, is from 95% to 5%, and the ratio $x/y$ is from 1:9 to 9:1.

The formation of copolymers while utilizing the novel linkage of the present invention gives rise to many advantages. Particularly in the production of rubber, a copolymer involving the present invention and isobutylene will introduce into the polyisobutylene-type polymer chain a group which allows rotation within the chain, giving a degree of freedom which does not exist in the closely-knit isobutylene polymer chain. Further, by forming a copolymer with isobutylene, the resulting polymer is susceptible to unsaturation by halogenation and dehydrohalogenation, or by oxidation and dehydration, as is set forth with respect to the homopolymer. The properties of the resulting copolymer may be controlled by the ratios of the coreactants.

For example, the production of a modified rubber by copolymerization of isobutylene with 3-methylbutene-1 is an important and valuable process. This may be accomplished by admixing isobutylene and 3-methylbutene-1 in the desired ratio, e.g., from 10:1 to 1:10, and contacting the mixture at a temperature within the range of —100° C. to —40° C. with aluminum chloride (AlCl$_3$) catalyst, either as such or in solution in an inert solvent similar to those set forth above in the discussion of the homopolymer. A reaction will ensue, which will result in the production of a copolymer having a structure as follows:

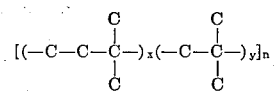

where $x$ and $y$ represent the relative amount of each repeating group. (Hydrogen atoms are omitted for clarity.)

Molecular weights in the range of 50,000 to 2,000,000 may be obtained, provided that inhibitors such as the conjugated and nonconjugated diolefins, normal olefins, etc., are excluded from the reaction zone. The 3-methylbutene-1 (and isobutylene, if necessary) may be treated for the removal of these poisons in the same manner as set forth above in the discussion of the preparation of 3-methylbutene-1 feed stocks for homopolymerization.

As exemplary of the preparation of a copolymer of 3-methylbutene-1 and isobutylene, the following runs were made.

*Example 16*

A treated 3-methylbutene-1 concentrate similar to that of Example 1 and a diolefin-free isobutylene charge stock were admixed in the ratio of 1 volume of isobutylene to 2 volumes of 3-methylbutene-1. A catalyst solution was formed by dissolving 0.9 g. of aluminum chloride in 182 g. of methyl chloride, and stirring the admixture for 2 hours at —70° C. The isobutylene-3-methylbutene-1 mixture was chilled to —70° C., and 133 cc. of the mixture were poured into the methyl chloride solution over a period of 45 minutes while stirring. A reaction ensued, causing the temperature to rise, giving a temperature range during reaction of —70° C. to —35° C. After completion of the addition of the isobutylene-3-methylbutene-1 mixture, the reaction mixture was stirred for 15 minutes, giving a total reaction time of 1 hour.

The resulting polymer was recovered by pouring the contents of the flask into hot water to flash off the methyl chloride. One hundred grams of polymer were recovered, which had a molecular weight of about 100,000 and which exhibited the structure of:

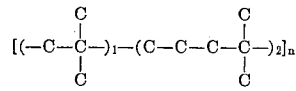

The polymer was an elastomer having good elastic properties, although the polymer flowed slightly upon long standing.

*Example 17*

A catalyst solution was prepared in a manner similar to Example 15, and a blend of inhibitor-free 3-methylbutene-1 and isobutylene (25 vol. percent 3-methylbutene-1) was added while stirring the catalyst mixture. The temperature of the reaction zone was maintained at —70° C. The olefin blend was added over a period of 10 minutes until 110 cc. of blend had been added. A very fast reaction occurred, without a concurrent rise in temperature.

The liquid phase of the flask was poured into hot water to flash off the methyl chloride, and 9.0 g. of a low molecular weight polymer were recovered. A high molecular weight polymer (70.0 g.) remained in the flask, which was recovered. The high molecular weight polymer exhibited a structure of:

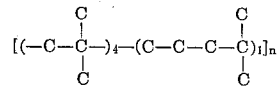

This polymer had a molecular weight of about 120,000 and represented a yield of 90% based on the olefin feed stock.

*Example 18*

A catalyst solution was prepared by stirring 0.75 g. of aluminum chloride in 150 cc. of methyl chloride for 2 hours at —70° C. An olefin blend of 50% isobutylene and 50% 3-methylbutene-1, diolefin free, was prepared. This blend was added to the catalyst solution over a period of 15 minutes, until a total of 110 cc. of the blend had been added. The temperature rose from —70° C. to —52° C. while a fast reaction was observed. A yield of 72.2 g. of polymer was recovered. The polymer product had a molecular weight of about 100,000, and had a structure of:

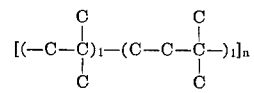

3-methylbutene-1 is not the only one of the olefins which can be copolymerized with isobutylene in order to form copolymers of the novel structure. 4-methylpentene-1, 3-methylpentene-1, and 5-methylhexene-1, or mixtures thereof, may also be copolymerized in a like manner.

*Example 19*

In order to illustrate the copolymerization of isobutylene with 4-methylpentene-1, the following run was made. A catalyst solution was prepared by dissolving 0.25 g. of aluminum chloride in 20 cc. of methyl chloride and stirring the solution for 30 minutes at —63° C. A blend of 4 cc. of isobutylene and 2 cc. of 4-methylpentene-1 was prepared and added to the catalyst solution at the temperature of —63° C. A fast reaction occurred, producing a polymer having a molecular weight of about 80,000 and a structure of:

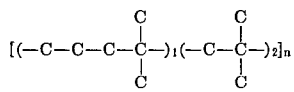

Substantially 100% conversion was obtained.

Example 20

A three component copolymer of isobutylene, 3-methylpentene-1, and 4-methylpentene-1 was prepared by the following process.

A catalyst solution of 0.25 g. of aluminum chloride in 20 cc. of methyl chloride was stirred for 30 minutes at —63° C. A blend of 4 cc. of isobutylene, 1 cc. of 3-methylpentene-1, and 1 cc. of 4-methylpentene-1 was prepared and was added to the stirred catalyst solution at —63° C. An instant reaction occurred, producing a polymer having a molecular weight of about 70,000 and exhibiting a structure of:

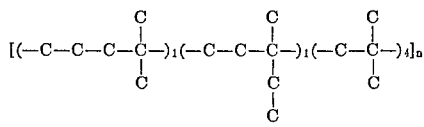

Substantially 100% conversion was obtained.

Besides forming copolymers with other olefins, such as isobutylene, the olefin feed stocks may also form copolymers with each other. As exemplary of one type of copolymer which may be formed, 3-methylpentene-1 and 4-methylpentene-1 were copolymerized in several runs. These runs are set forth in the following example.

Example 21

A catalyst solution of 0.25 g. of aluminum chloride in 20 cc. of methyl chloride was stirred for 30 minutes at —63° C. To the catalyst solution was then added a 55:45 by volume mixture of inhibitor-free 3-methylpentene-1 and 4-methylpentene-1. About 5 g. of this olefin mixture were charged. A good reaction ensued, producing 100% conversion to a polymer having a molecular weight of about 100,000 and exhibiting a structure of:

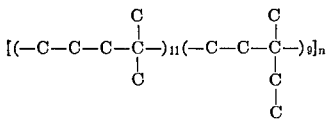

Example 22

To illustrate the desirability of adding catalyst in addition to the catalyst solution originally charged, the following run is presented. An olefin blend was prepared by distillation of light catalytic cracking naphthas. The feed stock had an analysis of:

| | |
|---|---|
| 3-methylpentene-1 | 52.1 |
| 4-methylpentene-1 | 43.1 |
| cis-4-methylpentene-2 | 1.0 |
| Cyclopentane | 3.0 |
| 2,3-dimethylbutene-1 | 0.5 |
| 2,2-dimethylbutane | 0.3 |

A catalyst solution was prepared by stirring 1.5 g. aluminum chloride in 573 g. of methyl chloride for 2 hours at —70° C. 150 cc. of this solution were placed in a flask, and 100 cc. of the above charge stock were added. The mixture was stirred for 2 hours with evidence of only about 10% polymerization. At this time, 0.15 g. of aluminum chloride was added, with polymerization occurring at an increased rate. Within 15 minutes, the polymerization rate had reached such a degree that the flask boiled over. 100% polymerization of the 3- and 4-methylpentene-1's was indicated. The material remaining in the flask was poured into hot water and the polymer recovered. Molecular weight appeared to be about 70,000 with a structure of:

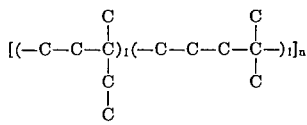

Example 23

A charge stock similar to that in Example 21 was placed in a test tube (2.0 cc. of charge stock). To the olefin was added 0.02 g. of aluminum chloride, and the mixture was shaken at 5 to 10 minute intervals during a 2-hour period. The reaction was carried out in an ice bath at 0° C. At the end of 2 hours, the reaction liquid was allowed to settle for 1 hour in an ice bath. At the end of this period, the polymer was dissolved in benzene, then precipitated with acetone and dried under a vacuum. The polymer recovered had a molecular weight of only 3000 and exhibited a structure of:

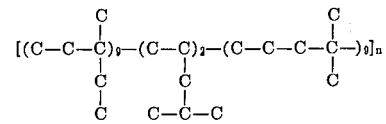

This is not the preferred high molecular weight polymer obtainable at the lower temperatures.

As has been shown by the above examples, by maintaining the reaction zone substantially normal and isodiolefin free and at low temperatures, a copolymer may be formed of 3-methlybutene-1, 4-methylpentene-1, 5-methylhexene-1, and 3-methylpentene-1, with isobutylene or with each other. In order to illustrate the effect of diolefin impurities upon the copolymerization reaction, the following runs were made.

Example 24

An olefin blend of untreated isobutylene and untreated 3-methylbutene-1 (containing 1,4-pentadiene and other contaminants) was prepared, using 50 cc. of each olefin. The olefin blend was added to a catalyst solution of —100° F., and was stirred for 2 hours. No reaction was noticeable. At this time 1 drop of tertiary butyl chloride and 4 cc. of 3-methylbutene-1 were added with no apparent effect. Then 0.5 g. of aluminum chloride was added and stirring was continued for an additional 4 hours. A product was obtained which was then washed with petroleum ether and poured into acetone. 8.9 g. of polymer were recovered. An inspection of this product indicated that only isobutylene was reacted, forming polyisobutylene with no 3-methylbutene-1 apparent in the polymer chain.

Example 25

In order to illustrate the effect of an isodiolefin, the following run was made. A catalyst solution of 0.25 g. of aluminum chloride in 20 cc. of methyl chloride was stirred at —73° C. for 30 minutes. To this catalyst solution was then added an olefin mixture of 4 cc. of isobutylene, 2 cc. of treated 3-methylbutene-1, and 0.3 cc. of isoprene. A reaction ensued, which produced a polymer of about 20,000 molecular weight. The conversion was only about 70% and was predominantly polyisobutylene. Only about 10% of the polymer appeared to be 3-methylbutene-1.

Example 26

In order to emphasize the significance of Example 25, the run was repeated under the same conditions except the isoprene was omitted. A polymer was recovered, 100% conversion being obtained, having a molecular weight of 50,000 and containing 33% methylbutene-1. An NMR analysis indicated the structure to be:

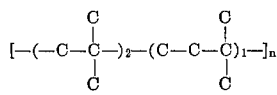

From a comparison of Examples 24 and 25 with Example 26, there is illustrated the deleterious effects of the diolefin and normal olefin contaminants upon the reaction rate, conversion level, molecular weight, and degree of polymerization which can be obtained.

*Example 27*

In order to illustrate the effect of a normal olefin, Example 25 was repeated by substituting 0.3 cc. of pentene-1 rather than 0.3 cc. of isoprene. Substantially 100% conversion was obtained, but the molecular weight of the product was only about 10,000.

It is apparent, then, that the reaction for copolymerization must be carried out in the substantial absence of conjugated diolefins, nonconjugated diolefins, isodiolefins, and normal olefins if the optimum results are to be obtained.

UNSATURATED POLYMERS

As has been previously stated, the polymeric elastomer which is mostly analogous to the polymers of the present invention is polyisobutylene rubber, which involves a di-substituted (geminal dimethyl) carbon atom in a repeating group, wherein the geminal dimethyl groups are separted by only a single alkylene group. As has been stated in the discussion of the advantages of the polymers

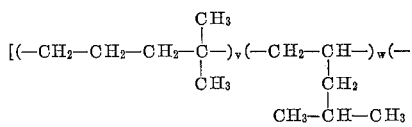

of the present invention, this closely-packed structure of the polyisobutylene gives rise to a loss of flexibility and of rotating freedom, which adversely affects the ability of polyisobutylene to dissipate heat. This problem is only somewhat less in butyl rubber, and the polymer of the present invention has advantages over butyl rubber as well as over polyisobutylene. A further disadvantage of polyisobutylene is the fact that the closely-packed structure makes it virtually impossible to unsaturate the polyisobutylene chain by halogenation and dehydrohalogenation without disrupting the chain and adversely affecting the average molecular weight. For this reason, polyisobutylene has been modified by copolymerization with unsaturated materials such as isoprene, in order to introduce a measure of unsaturation into the chain. Since the presence of an added alkylene group in the present polymers alleviates the crowded and sterically hindered structure which is predominant even in butyl rubber, unsaturation may be introduced by halogenation and dehydrohalogenation, by oxidation and dehydrolysis, or by other means of introducing unsaturation, all of which are well known to the art.

The presence of unsaturated linkages within the polymer chain is important from several standpoints, the greatest of which is the susceptibility of the polymer to vulcanization. Vulcanization accomplishes cross-linkages and allows the production of a rubbery material which can be bonded to natural rubber. With respect to polyisobutylene and to some extent butyl rubber, since further unsaturated linkages cannot be placed in the chain, bonding of polyisobutylene and butyl rubber to natural rubber has been accomplished only by using an intermediate layer of brominated rubber as an adhesive. With respect to the present polymers, however, unsaturation can be introduced into the polymer chain and a bondable rubber produced as above stated.

The degree of unsaturation in the polymer chain is preferably within the range of 1% to 5%. The structure of the unsaturated polymer will depend upon the isoolefin used to obtain the polymer. In the case of the 3-methylbutene homopolymer, for example, the structural formula would be:

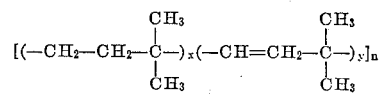

wherein $x$ and $y$ represent the relative amounts of each repeating group and wherein $y/(x+y)$ is from 0.005 to 0.10.

In the case of 4-methylpentene-1, the unsaturation can occur in several places. If a homopolymer having no dangling groups is used, the unsaturated polymer will have the structural formula:

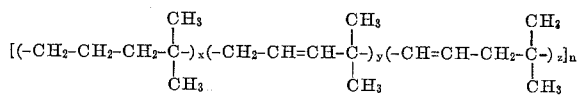

wherein $x$, $y$, and $z$ represent the relative amounts of each repeating group and wherein the degree of unsaturation $$\frac{(y+z)}{(x+y+z)}$$

will be within the range of 0.005 to 0.10. A preferred range is from 0.01 to 0.05.

Where dangling groups are present, the 4-methylpentene-1 can be unsaturated to give the structural formula:

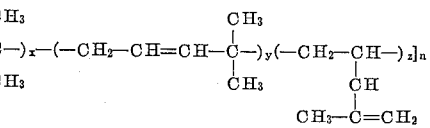

wherein $v$, $w$, $x$, $y$, and $z$ represent the relative amounts of each repeating group present in the copolymer. In this case, $$\frac{(x+y+z)}{(v+w+x+y+z)}$$

represents the degree of unsaturation and can be within the range of 0.005 to 0.10, preferably from 0.01 to 0.05.

The homopolymer of 3-methylpentene-1 has been shown to exhibit a dangling ethyl group even though polymerization is accomplished by the 1,3-linkage rather than the 1,2-linkage of the prior art. The dangling ethyl group provides a prime location for unsaturation to give functionality for cross-linking of the final polymer. The structural formula of the thus unsaturated 3-methylpentene-1 polymer can be represented by the formula:

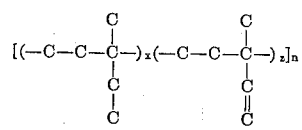

(Hydrogen atoms omitted for clarity)

The degree of unsaturation, $$\frac{z}{x+z}$$

can be from 0.005 to 0.10, preferably from 0.01 to 0.05. The unsaturation can be induced as in the case of the other polymers of the present invention by halogenation and dehydrohalogenation, oxidation and dehydrolysis, etc. During this type of unsaturation operation, statistically it would be expected that some measure of unsaturation would also occur in the chain, giving a formula for the unsaturated product as follows:

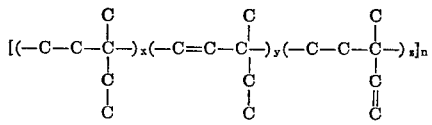

The degree of unsaturation, $$\frac{y+z}{x+y+z}$$

can be from 0.005 to 0.10, preferably from 0.01 to 0.05. As will be apparent from advertence to the structural formula, cross-linking can be accomplished through the unsaturated dangling ethyl group as well as from the unsaturation within the chain itself.

In like manner, unsaturated polymers of 5-methylhexene-1 can be formed having the formula:

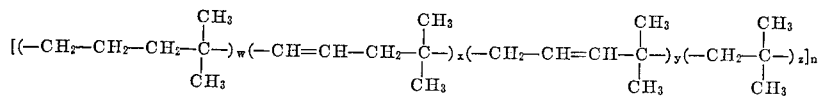

wherein $w$, $x$, $y$, and $z$ represent the relative amounts of each repeating group in the copolymer, and wherein the degree of unsaturation $$\frac{x+y+z}{w+x+y+z}$$

is from 0.005 to 0.10, preferably from 0.01 to 0.05. Where "structural copolymers" are involved, an unsaturation similar to that illustrated for 4-methylpentene-1 is formed:

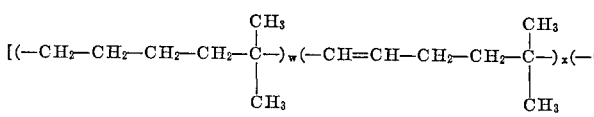

wherein $t$, $u$, $v$, $w$, $x$, $y$, and $z$ represent the relative amounts of each repeating group, and the degree of unsaturation $$\frac{u+v+w+y+z}{t+u+v+w+x+y+z}$$

is within the range of 0.005 to 0.10, preferably 0.01 to 0.05.

The unsaturated copolymers of these olefins with each other or with isobutylene can also be formed, having the structural formulas of the homopolymer but including the copolymeric repeating group. For example, the copolymer of 3-methylbutene-1 with isobutylene can be unsaturated to give a polymer of the formula:

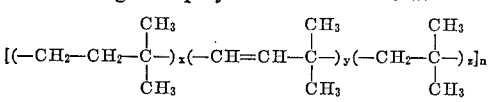

The degree of unsaturation, $$\frac{y}{x+y+z}$$

may be within the range of 0.005 to 0.10, preferably from 0.01 to 0.05.

The 4-methylpentene-1 copolymer with isobutylene may be unsaturated to produce a polymer having the formula:

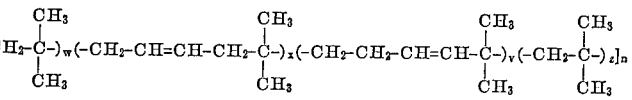

wherein $w$, $x$, $y$, and $z$ represent the relative proportions of each repeating group and the degree of unsaturation $$\frac{(x+y)}{(w+x+y+z)}$$

is within the range of 0.005 to 0.10, preferably from 0.01 to 0.05.

Likewise, the unsaturated copolymer of 5-methylpentene-1 and isobutylene exhibits the formula:

wherein $v$, $w$, $x$, $y$, and $z$ represent the relative proportions of the repeating groups and wherein the degree of unsaturation $$\frac{(w+x+y)}{(v+w+x+y+z)}$$

is within the range of 0.005 to 0.10, preferably from 0.01 to 0.05.

The novel unsaturated polymers of the present invention have particular utility in the compounding of automotive tires, and, in general, has a utility comparable to that of polyisobutylene and to the copolymer of isobutylene and isoprene.

The inventor having disclosed in detail the essence of his invention, with specific examples of preferred manners and best modes of practicing it, the protection to be accorded to the invention should be determined not by the specific examples, but by the scope of the appended claims.

I claim:
1. An amorphous, hydrocarbon-soluble, elastomeric polymer of the formula:

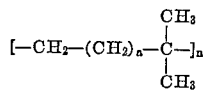

wherein $a$ is an integer from 1 to 3 and $n$ is sufficiently great to provide said polymer with its amorphous and elastomeric properties.

2. An amorphous, elastomeric polymer of 3-methylbutene-1 having the formula:

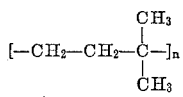

wherein $n$ is sufficiently great to provide said polymer with its amorphous and elastomeric properties.

3. An amorphous, hydrocarbon-soluble elastomeric polymer of 4-methylpentene-1 having the formula:

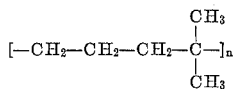

wherein $n$ is sufficiently great to provide said polymer with its amorphous and elastomeric properties.

4. An amorphous, elastomeric polymer of 5-methylhexene-1 having the formula:

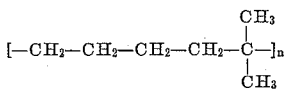

wherein $n$ is sufficiently great to provide said polymer with its amorphous and elastomeric properties.

5. An amorphous, elastomeric random copolymer having the formula:

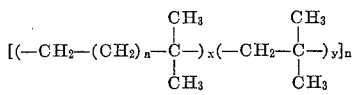

wherein $a$ is an integer from 1 to 3, $x$ is from 5% to 95% of the total repeating groups in the polymer, $y$ is from 95% to 5% of the total repeating groups in the polymer, and $n$ is sufficiently great to provide said polymer with its amorphous and elastomeric properties.

6. An amorphous, elastomeric random copolymer of 3-methylbutene-1 and isobutylene having the formula:

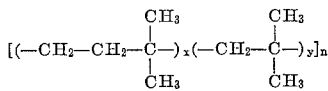

wherein $x$ represents from 95% to 5% of the total repeating groups in the polymer, $y$ represents from 5% to 95% of the total repeating groups in the polymer, and $n$ is sufficiently great to provide said polymer with its amorphous and elastomeric properties.

7. An amorphous, elastomeric random copolymer of 4-methylpentene-1 and isobutylene having the formula:

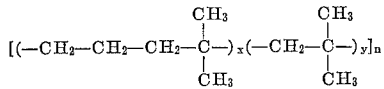

wherein $x$ represents from 95% to 5% of the total repeating groups in the polymer, $y$ represents from 5% to 95% of the total repeating groups in the polymer, and $n$ is sufficiently great to provide said polymer with its amorphous and elastomeric properties.

8. An amorphous, elastomeric random copolymer of 5-methylhexene-1 and isobutylene having the formula:

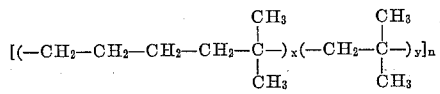

wherein $x$ represents from 95% to 5% of the total repeating groups in the polymer, $y$ represents from 5% to 95% of the total repeating groups in the polymer, and $n$ is sufficiently great to provide said polymer with its amorphous and elastomeric properties.

9. An amorphous, elastomeric randomly distributed polymer of 5-methylhexene-1 having the formula:

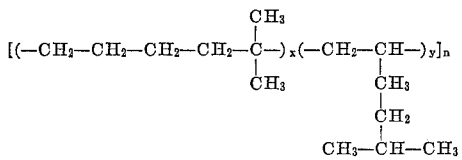

wherein $x$ represents from 10% to 90% of the total repeating groups in the polymer, $y$ represents from 90% to 10% of the total repeating groups in the polymer, and $n$ is sufficiently great to provide said polymer with its amorphous and elastomeric properties.

10. An amorphous, elastomeric random copolymer of 4-methylpentene-1 and isobutylene having the formula:

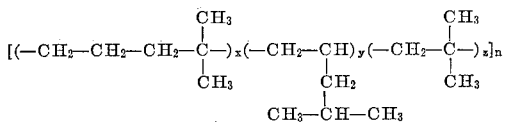

wherein $z$ represents from 5% to 95% of the total repeating groups in the polymer, $x+y$ represent from 95% to 5% of the total repeating groups in the polymer, the ratio of $x$ to $y$ is within the range from 1:9 to 9:1, and $n$ is sufficiently great to provide said polymer with its amorphous and elastomeric properties.

11. An amorphous, elastomeric random copolymer of 5-methylhexene-1 and isobutylene having the formula:

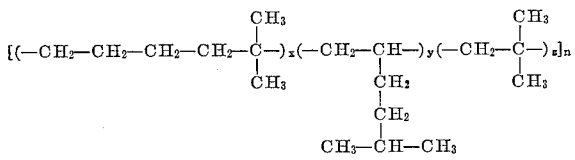

wherein $z$ represents from 5% to 95% of the total repeating groups in the polymer, $x+y$ represent from 95% to 5% of the total repeating groups in the polymer, the ratio of $x$ to $y$ is within the range from 1:9 to 9:1, and $n$ is sufficiently great to provide said polymer with its amorphous and elastomeric properties.

12. An amorphous, elastomeric randomly distributed polymer having the formula:

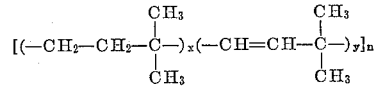

wherein $y/(x+z)$ is within the range from 0.005:1 to 0.1:1 and $n$ is sufficiently great to provide said polymer with its amorphous and elastomeric properties.

13. An amorphous, elastomeric randomly distributed polymer having the formula:

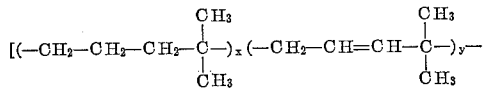

wherein the ratio of $(y+z)$ to $(x+y+z)$ is within the range from 0.005:1 to 0.1:1 and $n$ is sufficiently great to provide said polymer with its amorphous and elastomeric properties.

14. An amorphous, elastomeric randomly distributed polymer having the formula:

$$[(-CH_2-CH_2-CH_2-CH_2-\underset{\underset{CH_3}{|}}{\overset{\overset{CH_3}{|}}{C}}-)_t(-CH=CH-CH_2-CH_2-\underset{\underset{CH_3}{|}}{\overset{\overset{CH_3}{|}}{C}}-)_u(-CH_2-CH=CH-CH_2-\underset{\underset{CH_3}{|}}{\overset{\overset{CH_3}{|}}{C}}-)_v$$

$$(-CH_2-CH_2-CH=CH-\underset{\underset{CH_3}{|}}{\overset{\overset{CH_3}{|}}{C}}-)_w(-CH_2-\underset{\underset{CH_2}{|}\atop\underset{CH_3-CH-CH_3}{|}}{\overset{\overset{CH_3}{|}}{CH}}-)_x(-CH_2-\underset{\underset{CH}{|}\atop\underset{CH_3-CH-CH_3}{|}}{\overset{\overset{CH}{||}}{CH}}-)_y(-CH_2-\underset{\underset{CH_2}{|}\atop\underset{CH_3-C=CH_2}{|}}{\overset{\overset{CH_2}{|}}{CH}}-)_z]_n$$

wherein the ratio of $$\frac{u+v+w+y+z}{t+u+v+w+x+y+z}$$

is within the range of 0.005 to 0.10 and wherein $n$ is sufficiently great to provide said polymer with its amorphous and elastomeric properties.

15. An amorphous, elastomeric random polymer derived from 3-methylbutene-1 and isobutylene having the formula:

$$[(-CH_2-CH_2-\underset{\underset{CH_3}{|}}{\overset{\overset{CH_3}{|}}{C}}-)_x(-CH=CH-\underset{\underset{CH_3}{|}}{\overset{\overset{CH_3}{|}}{C}}-)_y(-CH_2-\underset{\underset{CH_3}{|}}{\overset{\overset{CH_3}{|}}{C}}-)_z]_n$$

wherein the ratio of $(x+y)$ to $z$ is within the range of 1:9 to 9:1, wherein the ratio of $y$ to $(x+y+z)$ is within the range from 0.005 to 0.10, and wherein $n$ is sufficiently great to provide said polymer with its amorphous and elastomeric properties.

16. An amorphous, elastomeric random polymer derived from 4-methylpentene-1 and isobutylene having the formula:

$$[(-CH_2-CH_2-CH_2-\underset{\underset{CH_3}{|}}{\overset{\overset{CH_3}{|}}{C}}-)_w(-CH=CH-CH_2-\underset{\underset{CH_3}{|}}{\overset{\overset{CH_3}{|}}{C}}-)_x(-CH_2-CH=CH-\underset{\underset{CH_3}{|}}{\overset{\overset{CH_3}{|}}{C}}-)_y(-CH_2-\underset{\underset{CH_3}{|}}{\overset{\overset{CH_3}{|}}{C}}-)_z]_n$$

wherein the ratio of $(w+x+y)$ to $z$ is withi nthe range of 1:9 to 9:1, the ratio of $(x+y)$ to $(w+x+y+z)$ is within the range of 0.005 to 0.10 and $n$ is sufficiently great to provide said polymer with its amorphous and elastomeric properties.

17. An amorphous, elastomeric random polymer derived from 5-methylhexene-1 and isobutylene having the formula:

$$[(-CH_2-CH_2-CH_2-CH_2-\underset{\underset{CH_3}{|}}{\overset{\overset{CH_3}{|}}{C}}-)_v(-CH=CH-CH_2-CH_2-\underset{\underset{CH_3}{|}}{\overset{\overset{CH_3}{|}}{C}}-)_w(-CH_2-CH=CH-CH_2-\underset{\underset{CH_3}{|}}{\overset{\overset{CH_3}{|}}{C}}-)_x(-CH_2-CH_2-CH=CH-\underset{\underset{CH_3}{|}}{\overset{\overset{CH_3}{|}}{C}}-)_y(-CH_2-\underset{\underset{CH_3}{|}}{\overset{\overset{CH_3}{|}}{C}}-)_z]_n$$

wherein the ratio of $(v+w+x+y)$ to $z$ is within the range of 1:9 to 9:1, the ratio of $(w+x+y)$ to $$(v+w+x+y+z)$$

is within the range of 0.005 to 0.10 and $n$ is sufficiently great to provide said polymer with its amorphous and elastomeric properties.

18. An amorphous, elastomeric random copolymer of 3-methylpentene-1 and 4-methylpentene-1 having the formula:

$$[(CH_2-CH_2-\underset{\underset{CH_3}{|}\atop\underset{}{}}{\overset{\overset{CH_3}{|}}{C}}-)_x(CH_2-CH_2-CH_2-\underset{\underset{CH_3}{|}}{\overset{\overset{CH_3}{|}}{C}}-)_y]_n$$

wherein the ratio of $x$ to $y$ is within the range of about 1:1 to about 5:4, and wherein $n$ is sufficiently great to provide said polymer with its amorphous and elastomeric properties.

19. A method of producing a predominantly hydrocarbon-soluble amorphous, elastomeric polymer which comprises contacting an isoolefin chosen from the group consisting of 4-methylpentene-1 and 5-methylhexene-1 with aluminum chloride catalyst at a temperature within the range of $-150°$ C. to $0°$ C. and in the absence of normal olefins, normal diolefins, and isodiolefins.

20. A method of preparing a predominantly-soluble amorphous, elastomeric homopolymer which comprises polymerizing a normal olefin free and diolefin-free isoolefin chosen from the group consisting of 4-methylpentene-1 and 5-methylhexene-1 in admixture with a catalyst solution consisting of aluminum chloride in an inert solvent, said aluminum chloride being present in said solvent in amounts exceeding the solubility of said aluminum chloride in said solvent at the contact temperature, the ratio of solution to isoolefin being in the range of 20:1 to 1:3, and the temperature being within the range of $-150°$ C. to $-40°$ C.

21. A method of preparing an amorphous, elastomeric mixed structure homopolymer of 4-methylpentene-1 which comprises contacting said 4-methylpentene-1 with an aluminum chloride catalyst in a reaction zone free of normal olefins and diolefins at a temperature within the range of $-60°$ C. to $-40°$ C., whereby a polymer of the structure:

$$[(-CH_2-CH_2-CH_2-\underset{\underset{CH_3}{|}}{\overset{\overset{CH_3}{|}}{C}}-)_x(-CH_2-\underset{\underset{CH_3-CH-CH_3}{|}}{\overset{\overset{CH_2}{|}}{CH}}-)_y]_n$$

is obtained, wherein $x$ and $y$ represent the relative amounts of each repeating group and $n$ is sufficiently large to provide said polymer with amorphous and elastomeric properties.

22. A method in accordance with claim 21 wherein the solvent is methyl chloride, the concentration of aluminum chloride in methyl chloride is at least 0.1 g. per 100 cc., and the ratio of catalyst solution to 4-methylpentene-1 is 20 cc. per cc. to 0.3 cc. per cc.

23. A method which comprises contacting in an inhibitor-free reaction zone a mixture of 3-methylpentene-1 and 4-methylpentene-1 with an aluminum chloride catalyst at a temperature below $-40°$ C., wherein the ratio of 3-methylpentene-1 to 4-methylpentene-1 is about 55:45, whereby a polymer is obtained having the formula:

$$[(-CH_2-CH_2-CH_2-\underset{\underset{CH_3}{|}}{\overset{\overset{CH_3}{|}}{C}}-)_{11})-CH_2-CH_2-\underset{\underset{CH_3}{|}\atop\underset{}{}}{\overset{\overset{CH_3}{|}}{C}}-)_9]_n$$

wherein $n$ is sufficiently large to impart amorphous and elastomeric properties to said polymer.

24. An amorphous, elastomeric polymer of 3-methylpentene-1 having the formula:

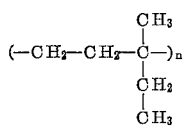

wherein $n$ is sufficiently great to provide said polymer with its amorphous and elastomeric properties.

25. An amorphous, elastomeric randomly distributed polymer derived from 3-methylpentene-1 having the formula:

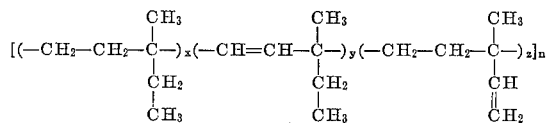

wherein $$\frac{y+z}{x+y+z}$$

is within the range from about 0.005 to about 0.10 and $n$ is sufficiently great to provide said polymer with its amorphous and elastomeric properties.

26. A method of producing an amorphous, elastomeric polymer which comprises contacting 3-methylpentene-1 with an aluminum chloride catalyst at a temperature within the range of −150° C. to 0° C., in the absence of normal olefins, normal diolefins, and isodiolefins.

References Cited by the Examiner

UNITED STATES PATENTS

| | | | |
|---|---|---|---|
| 2,387,784 | 10/1945 | Thomas | 260—94.9 |
| 2,427,303 | 9/1947 | Reid | 260—94.8 |
| 2,439,610 | 4/1948 | Morris | 260—94.9 |
| 2,449,949 | 9/1948 | Morris | 260—96 |
| 2,474,671 | 6/1949 | Hersberger | 260—94.8 |
| 2,561,226 | 7/1951 | Powers | 260—94.9 |
| 2,681,903 | 6/1954 | Linsk | 260—94.9 |
| 2,971,993 | 2/1961 | Kimberlin et al. | 260—677 |
| 3,061,654 | 10/1962 | Gersheimer et al. | 260—677 |

JOSEPH L. SCHOFER, *Primary Examiner.*

WILLIAM H. SHORT, *Examiner.*

J. W. SANNER, M. B. KURTZMAN,
*Assistant Examiners.*